W. W. TALBOT.
PRESSURE GAGE.
APPLICATION FILED JULY 19, 1917.
1,271,802.
Patented July 9, 1918.
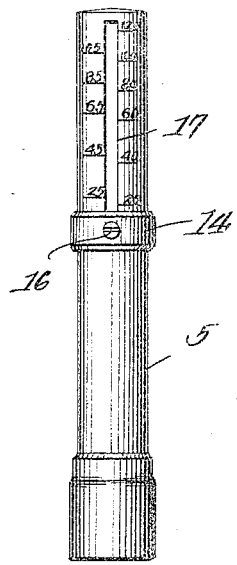
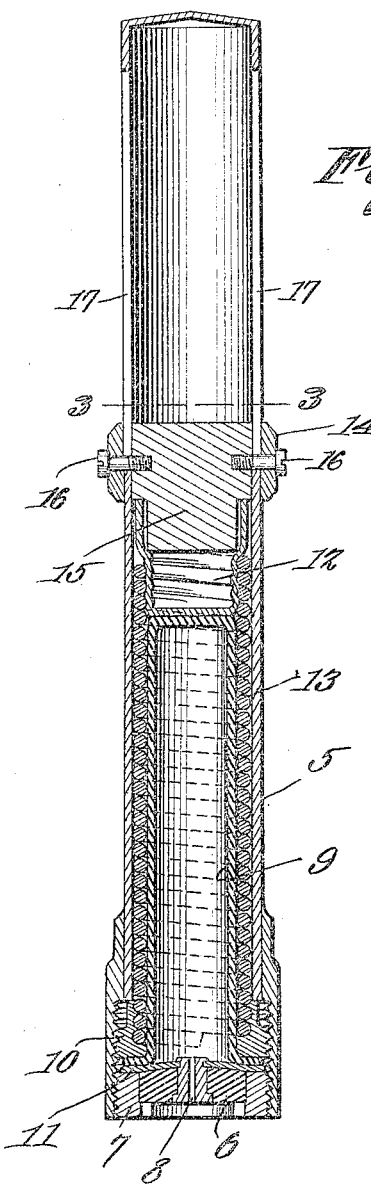
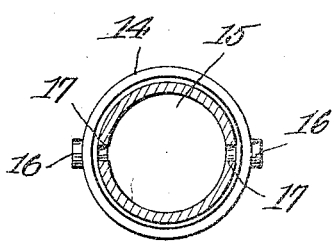
Inventor
William W. Talbot,
By Henry G. Brewington,
Attorney

UNITED STATES PATENT OFFICE.

WILLIAM W. TALBOT, OF BALTIMORE, MARYLAND, ASSIGNOR OF ONE-HALF TO AKRON TIRE AND RUBBER COMPANY, INC., OF BALTIMORE, MARYLAND, A CORPORATION OF MARYLAND.

PRESSURE-GAGE.

1,271,802.  Specification of Letters Patent.  Patented July 9, 1918.

Application filed July 19, 1917. Serial No. 181,520.

*To all whom it may concern:*

Be it known that I, WILLIAM W. TALBOT, a citizen of the United States, residing at Baltimore, State of Maryland, have invented certain new and useful Improvements in Pressure-Gages, of which the following is a specification.

This invention relates to gages for measuring the air pressure in pneumatic tires, and its object is to provide such a gage with a novel and improved indicator whereby the gage may be easily read.

The object stated is attained by means of a combination and arrangement of parts to be hereinafter described and claimed, and in order that the same may be better understood reference is had to the accompanying drawing forming a part of this specification.

In the drawing—

Figure 1 is an elevation of the gage;

Fig. 2 is an enlarged longitudinal section thereof, and

Fig. 3 is a cross-section on the line 3—3 of Fig. 2.

Referring specifically to the drawing, the body of the gage is a tube 5 open at one end and fitted thereat with a plug 6 held by a screw ring 7. The plug 6 is fitted with the usual nipple 8 through which the air pressure enters the gage.

In the body 5 is housed a flexible bag 9 having its mouth located over the nipple 8 and clamped between the ring 7 and a second screw ring 10, with a washer 11 interposed between the bag and the ring 7. The body 5 is screw-threaded internally as shown in Fig. 2 to hold the rings 7 and 10. At the closed end of the bag 9 is located a slidable cup-shaped plunger 12 to which is made fast one end of a spring 13 having its other end made fast to the ring 10. The spring is coiled around the bag 9, and as the latter is flexible, it will be seen that it is distended when the pressure enters the same, whereupon it presses against the plunger 12 and advances the same in the tube 5 against the tension of the spring 13.

The tube 5 is continued some distance beyond that portion of the tube occupied by the plunger 12 when the gage is not in use, and the plunger is movable into this tube extension, the same being graduated externally and carrying an indicator pointing on said graduations so that the degree of the air pressure may be observed. The indicator is a ring 14 encircling the tube extension externally and free to slide thereon. In the tube extension is slidably mounted a plug 15 which is positioned adjacent to the outer end of the plunger 12, its inner end being reduced to seat therein. The ring 14 is fastened to the plug 15 by diametrically opposite screws 16 passing through longitudinal slots 17 in the tube extension. The graduations are along these slots.

In use, when the bag 9, distended by the air pressure, advances the plunger 12, the latter slides the plug 15 outward, and as the ring 14 moves with the plug the degree of the air pressure is indicated by the ring on the graduations. The plug is not fastened to the plunger and the ring therefore remains in the position to which it has been moved, so that when the plunger recedes the ring remains in indicating position, whereby the reading of the gage is facilitated.

The friction between the ring 14 and the plug 15, and the tube extension on which said plug and ring slide, is sufficient to hold the ring in recording position after the plunger 12 recedes. However, the weight of the ring and the plug is not great enough to require an excessive amount of friction to hold the same, and hence the frictional engagement of these parts with the tube extension is not such as would impede the advance of the plunger 12 when the bag 9 is distended by the air pressure.

I claim:

A tire gage comprising a slotted tubular body, a pressure actuated plunger in the body and having its outer end cup-shaped, a plug having a sliding fit in the body and provided with a reduced inner end seating loosely in the cup-shaped outer end of the plunger, and an indicator ring carried by the plug and encircling the body externally, the latter having graduations for the ring.

In testimony whereof I affix my signature in presence of two witnesses

WILLIAM W. TALBOT.

Witnesses:
FLORENCE GUTBEILET,
E. WALTON BREWINGTON.